United States Patent
Priaroggia

[11] 3,813,476
[45] May 28, 1974

[54] UNDERWATER OIL-FILLED ELECTRICAL CABLE INSTALLATION WITH MEANS LOCALLY SUPPORTING THE CABLE ABOVE THE BED OF THE WATER

[75] Inventor: Paolo Gazzana Priaroggia, Milan, Italy

[73] Assignee: Industrie Pirelli Societa per Azioni, Milan, Italy

[22] Filed: June 18, 1973

[21] Appl. No.: 371,119

[30] Foreign Application Priority Data
July 3, 1972   Italy ................................ 26534/72

[52] U.S. Cl. .................... 174/37, 61/72.3, 174/135
[51] Int. Cl. ............................................. H02g 9/02
[58] Field of Search ........ 174/8, 23 R, 24, 37, 68 R, 174/70 R, 70 S, 99 R, 111, 135, 136, 155, 156; 24/114.5; 61/72.3; 138/106, 110; 254/134.3 SC

[56] References Cited
UNITED STATES PATENTS

| | | | |
|---|---|---|---|
| 11,539 | 8/1854 | Webb | 174/155 |
| 303,483 | 8/1884 | Bailey | 174/155 |
| 403,491 | 5/1889 | Smith | 174/155 |
| 470,883 | 3/1892 | Vanstone | 174/111 |
| 1,640,744 | 8/1927 | Zapf | 174/135 |
| 1,742,354 | 1/1930 | Hunter | 174/99 R |
| 1,822,624 | 9/1931 | Hoeftmann | 174/136 X |
| 2,290,139 | 7/1942 | Buchanan | 174/155 X |
| 2,981,074 | 4/1961 | Wilder | 61/72.3 X |

Primary Examiner—Laramie E. Askin
Attorney, Agent, or Firm—Brooks Haidt & Haffner

[57] ABSTRACT

A device for encircling an oil-filled underwater cable to lift a portion of the cable above the floor of the body of water upon which the cable is laid. By placing a device according to the invention around a cable, any water that infiltrates the cable is precluded from passing the lifted portion surrounded by the device. A plurality of devices of the invention at spaced locations along a cable will localize the damage due to water penetration to the cable section between two of the encircling devices. The device can suitably be formed of two detachably interconnected identical half-shells having convexly curved inner and outer surfaces, the joined half-shells forming a toroidal casing with a central hole for receiving the cable.

3 Claims, 2 Drawing Figures

PATENTED MAY 28 1974  3,813,476

UNDERWATER OIL-FILLED ELECTRICAL CABLE INSTALLATION WITH MEANS LOCALLY SUPPORTING THE CABLE ABOVE THE BED OF THE WATER

BACKGROUND OF THE INVENTION

1. Field of the Invention

The present invention relates to underwater electrical cables of the oil-filled type, and more particularly to an auxiliary device for limiting the passage along the length of such cables of water which may infiltrate the cable at a point where the cable has been damaged. The device of the invention is suitable for use not only with submarine electrical cables but also for use with cables laid on the bottoms of rivers, lakes or other bodies of water.

2. Discussion of the Prior Art

Electrical cables of the oil-filled type, that is, cables with one or more longitudinal oil ducts or channels, have been employed for underwater electrical transmission, but in such applications there has been a danger of ambient water entering the cable through the cable covering. Such leakage can result not only from defects in design, manufacture or installation of an underwater cable, but also from accidental damage after the cable has been laid. Accidental damage such as a tear in the cable covering often results from strong impacts against the cables by blunt or sharp bodies, for instance, the anchors of ships.

The cable goes on working satisfactorily if such an accidental tear extends only to the outer covering or to a protecting sheath of the cable. However, if the tear reaches as far as insulating paper and the conductors of the cables, the fluid oil, which is constantly fed into the cable from reservoirs and which circulates in ducts provided inside the cable, flows out through the tear, because the oil pressure is always greater than that of the surrounding water.

As a result of the dimensions of such an accidental tear or because of the time which can pass before the cable is repaired, it may happen that a play of surface tensions may arise at the interface between the fluid oil and the sea water, causing some drops of water to penetrate into the fluid oil ducts. Moreover, such infiltrating water can move along the cable, inside the oil ducts, increasing the extent of the damage and the length of cable portion which must be repaired.

No satisfactory solution for this problem of water penetration into and along the oil ducts of oil-filled under-water electrical cables has been provided by the prior art.

SUMMARY OF THE INVENTION

The present invention is directed to the limiting of damage to underwater electrical cables of the oil-filled type by localizing the extent to which infiltrating water can travel along oil ducts of the cable. Thus, if a cable is accidentally torn after installation, the length of cable which can be damaged by water entering through the tear is limited to the length of cable between the positions of cable-protecting devices according to the invention. Accordingly, subsequent repair of the cable will be more localized, simple and economical.

It is therefore an object of the present invention to provide an auxiliary device able to limit the displacement of casual water infiltrations along the inside of the oil ducts of an electric cable of the oil-filled type. In accordance with the invention, an effective cable protection system comprises means which keep the cable supported locally out of direct contact with the bottom of the body of water in which the cable is laid.

In a preferred embodiment of the invention, these local cable supporting means are formed as toroidal sleeves of appropriate configuration, which encompass the cable at longitudinally spaced locations.

The objects and advantages of the present invention will be better understood from the following description, given by way of non-limiting example and made with reference to the attached drawings.

DETAILED DESCRIPTION OF A PREFERRED EMBODIMENT

Figure 1:
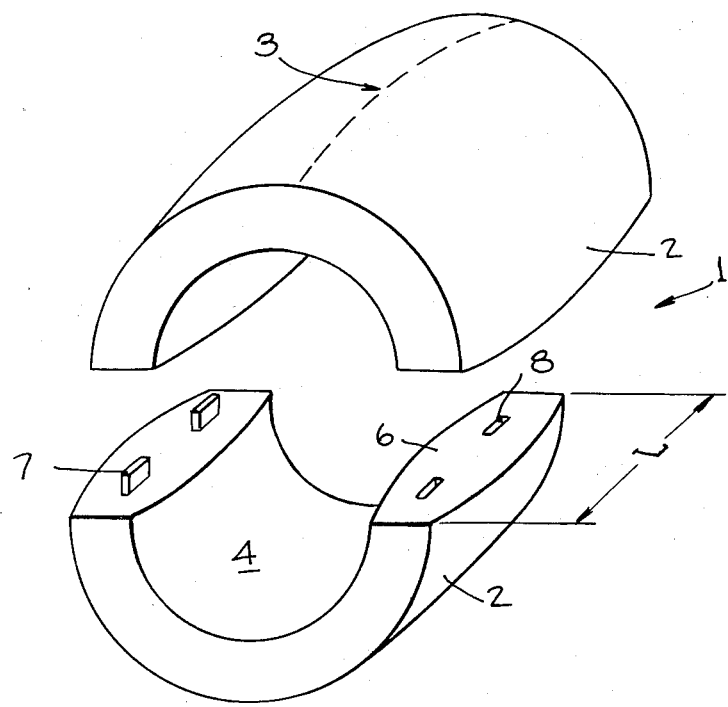
FIG. 1 represents in exploded view a preferred embodiment of the device of the invention.
Figure 2:
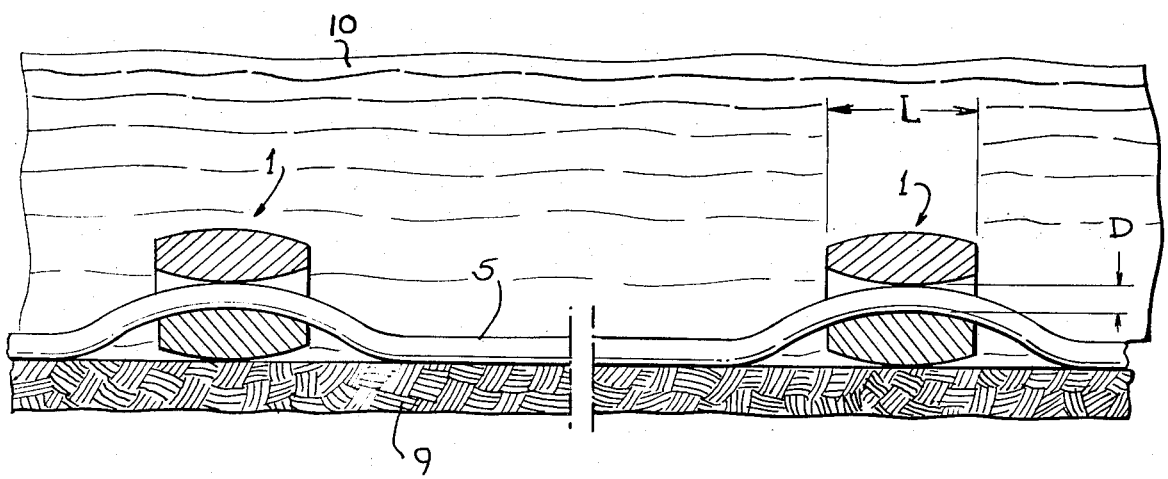
FIG. 2 represents the employment of the device of FIG. 1 to protect a cable.

A preferred embodiment of the device of the invention for localizing damage due to water entering the oil ducts of an electrical cable of the oil-filled type is illustrated as a toroidal casing or sleeve generally designated by the reference numeral 1 in FIGS. 1 and 2 of the drawing. For ease in positioning of the casing 1 around a cable shown at 5 in FIG. 2, the casing 1 is suitably formed of two or more curved segments which can be readily joined together around the cable to constitute a complete annulus. In the preferred embodiment shown in FIG. 1 there are two such curved segments 2, each of which extends through 180°. These semi-annular segments 2 are referred to hereinafter as half-shells.

The half-shells 2 are formed of rigid material and have a specific gravity greater than water so the casing 1 exerts no buoyant force on the cable 5 when the cable has been laid. These half-shells 2, when joined together do not form a simple cylinder, but have internal and external convexly curved surfaces. As shown in FIGS. 1 and 2 the internal longitudinal cavity 4 for the reception of the cable 5 therethrough narrows to a diameter D at the longitudinal midpoint of the casing 1, while the exterior of each half-shell 2 has an outwardly curved profile 3, suitably following an arc of a circle. The internal longitudinal curvature can also follow an arc of a circle. Thus the casing 1 is thickest at its longitudinal midpoint as shown in the drawings.

As noted above the internal longitudinal cavity 4 formed between the half-shells 2 receives a cable 5, so at its narrowest diameter D the cavity 4 must be as large or larger than the outer diameter of the cable 5. Preferably this smallest internal diameter D is slightly larger than the outer diameter of the cable around which the casing is to be fitted.

Since cables like the cable 5 are ordinarily circular in cross section, the internal channel 4 and the external surfaces of the half-shells 2 are arcuate in transverse section so that a transverse section at any point through the casing 1 is in the form of a ring of uniform radial thickness. The ring-like shape of one end of the casing 1 can be seen from the exploded view of FIG. 1.

Referring now to FIG. 2 it can be seen that the casing 1 is not shaped like a doughnut but is elongated, the length L of the cavity 4 through which the cable 5 passes being considerably greater than the internal diameter D of the central cavity at its narrow midpoint. It has been found that for best operation the length L is from 2 to 8 times the minimum diameter D.

Each half-shell 2, as shown, has a pair of flat end faces 6. The end surfaces 6 of each half-shell 2 lie in the same plane, which plane is bisected by the longitudinal axis of the assembled casing 1. Since the half-shells 2 are mutually identical, their end surfaces 6 will mate exactly when the half-shells 2 are centered in place around a cable 5.

JOining means shown as female sockets 8 and male tabs 7 are provided on the end surfaces 6 of the half-shells 2, each half-shell preferably having a pair of longitudinally spaced male elements 8 on one end surface and a pair of sockets 7 at its other end surface 6. These means 7 and 8 are shown for purposes of illustration, but other suitable conventional means could be used to join the half-shells 2 together to form the complete annular casing 1 with all end surfaces 6 in mating contact.

It is essential that the joining means 7 and 8 or other suitable joining means employed must be easy to connect and to disengage so that there is no delay in positioning the protective devices 1 upon laying cable or in removing the devices 1 from the cable upon recovery of the cable.

During a cable laying operation, a plurality of half-shells 2 is kept in proximity of a stern pulley, over which the cable passes after having been paid off from a capstan. At pre-established distances, conveniently short, pairs of half-shells 2 are coupled around the cable 5 in such a way that the through cavities 4 of the casings 1 so formed surround the cable 5. Since the cavity 4 is preferably slightly larger than the cable diameter, the cable 5 can be allowed to pass continuously through the casing until the half-shells 2 have been tightly interconnected. Then the casings 1 can be secured at the desired locations around the cable 5 by means not illustrated, for instance a small rope. Owing to its much greater weight, the cable 5 will drag the casings 1 overboard along with the cable.

As shown in FIG. 2, once the cable 5 has been laid, it does not lie directly on the bottom of the body of water in which it has been placed, but is locally lifted at spaced points from direct contact with the bottom 9 of the body of water 10. In particular, the profile 3, shaped as an arc of a circle, facilitates the arrangement of the casings 1 on the bottom 9, even if this bed or bottom is particularly irregular. Preferably the casing has an outer diameter at least three times the cable thickness, so the cable is locally lifted by at least its own diameter above the floor of the body of water. Thus the casing has an outer diameter of at least three times the minimum diameter D of the cable-receiving cavity 4.

It might be possible to keep the cable 5 lifted from direct contact with the bottom 9 by placing washer-like discs with central holes around the cable at spaced locations. However, such discs could deform the cable locally, because of the sudden variation of curvature which they would impart to the cable. On the contrary, the configuration of the inner surface of the cavity 4 according to the present invention which is formed as an arc of circle with its convexity directed towards the axis of the casing 1, permits the cable 5 to lie upon the casing 1 without suffering any deformation, since the cavity length L, as already noted, is considerable.

The casing of the present invention protects a cable in the following way. If the anchor of a ship, for instance, should strike violently against a cable 5 (which, for the sake of simplicity, can be assumed to be a single-core cable), in such a way as to produce a tear extending as far as the conductor, drops of water can enter into the fluid oil duct of the cable which is generally in contact with the conductor of the cable. No matter where such a tear takes place, the drops of water cannot move along the cable inside the fluid oil duct, beyond the two casings located on opposite sides of the tear, the casings in effect acting as siphons.

Therefore, at the worst, the cable portion to be repaired will have a length equal to the interval between two successive casings 1. Therefore, it will never be necessary to replace a whole cable length.

The adoption of casings 1 according to the invention provides a further advantage with respect to the repair of a cable after it has suffered damage. After having cut the cable into two pieces, while it lies on the bottom, with well-known means (for instance by means of the cutting device described in U.S. Pat. No. 3,516,158 assigned to the assignee of this application), each piece of cable is recovered with the aid of a grappler, or by means of ropes tied to the cable at points immediately beyond the casings which are nearest to the cuts. Therefore, during the recovering operation, the contents of the oil duct, including any water which may have entered, are completely discharged into the water, so that not even during recovery can the water move towards the sound portions of the cable.

It is understood that the auxiliary device of the invention can be modified and made in various ways deriving from the above indicated inventive concept, without departing from the spirit and scope of the invention.

What is claimed is:

1. In an underwater electric cable installation in which the cable rests on the bed of the water, said cable being a relatively long, oil-filled cable having a normally fluid impervious sheath and internal oil ducts, the combination therewith of means for confining the water which may flow into said cable due to a tear in said sheath to a predetermined length of said cable in which said tear occurs, said means comprising a plurality of similar casings encircling said cable in spaced relation therealong leaving the cable exposed intermediate said casings, each of said casings supporting the portion of the cable encircled thereby and having a dimension intermediate said cable and said bed at least equal to the diameter of said cable thereby to maintain said portion above said bed by a distance at least equal to the diameter of said cable and the spacing between the casings on said cable being sufficient to permit the cable to bend intermediate the casings and engage said bed, and each of said casings comprising two parts with means for holding them together around said cable, said two parts having inner surfaces spaced from each other and extending longitudinally of said cable to define a longitudinally extending cavity for receiving said cable, at least the inner surface nearer said bed being convex in longitudinal section and longer than the diameter of said cable to prevent deformation of said cable at the portion thereof within said casing.

2. A cable installation as set forth in claim 1, wherein said two parts are of substantially the same size and shape and the outer surfaces thereof are convex in longitudinal section.

3. A cable installation as set forth in claim 2, wherein said inner surface has a length from about two to eight times the diameter of said cable.

* * * * *